US008608569B2

(12) United States Patent
Carrico et al.

(10) Patent No.: US 8,608,569 B2
(45) Date of Patent: Dec. 17, 2013

(54) GRAPHIC CAPTURE IN A MOBILE LOYALTY NETWORK

(75) Inventors: David Carrico, Reno, NV (US); Danny Miles, Reno, NV (US)

(73) Assignee: IGT, Reno, NV (US)

( * ) Notice: Subject to any disclaimer, the term of this patent is extended or adjusted under 35 U.S.C. 154(b) by 258 days.

(21) Appl. No.: 13/156,903

(22) Filed: Jun. 9, 2011

(65) Prior Publication Data

US 2012/0315984 A1 Dec. 13, 2012

(51) Int. Cl.
*G06F 17/00* (2006.01)

(52) U.S. Cl.
USPC ............................................. 463/42

(58) Field of Classification Search
USPC ............................................. 463/42
See application file for complete search history.

(56) References Cited

U.S. PATENT DOCUMENTS

| | | | |
|---|---|---|---|
| 6,676,522 B2 | 1/2004 | Rowe et al. | |
| 6,831,682 B1 | 12/2004 | Silverbrook et al. | |
| 7,403,788 B2 | 7/2008 | Trioano et al. | |
| 7,611,409 B2 | 11/2009 | Muir et al. | |
| 7,803,053 B2 | 9/2010 | Atkinson | |
| 2007/0202941 A1 | 8/2007 | Miltenberger et al. | |
| 2007/0243928 A1* | 10/2007 | Iddings | 463/26 |
| 2008/0076572 A1 | 3/2008 | Nguyen et al. | |
| 2008/0200240 A1* | 8/2008 | Saltiel et al. | 463/25 |
| 2009/0098943 A1 | 4/2009 | Weber et al. | |
| 2010/0029376 A1* | 2/2010 | Hardy et al. | 463/25 |
| 2010/0225653 A1* | 9/2010 | Sao et al. | 345/520 |
| 2011/0263325 A1* | 10/2011 | Atkinson | 463/31 |
| 2011/0307318 A1* | 12/2011 | Laporte et al. | 705/14.33 |

OTHER PUBLICATIONS

U.S. Appl. No. 13/157,166, filed Jun. 9, 2011.
U.S. Appl. No. 13/217,105, filed Aug. 24, 2011.
U.S. Appl. No. 13/217,110, filed Aug. 24, 2011.
U.S. Appl. No. 13/220,430, filed Aug. 29, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/335,613, filed Dec. 22, 2011.
U.S. Appl. No. 13/426,479, filed Mar. 21, 2011.

\* cited by examiner

*Primary Examiner* — Dmitry Suhol
*Assistant Examiner* — Carl V Larsen
(74) *Attorney, Agent, or Firm* — Foley & Lardner LLP

(57) ABSTRACT

A gaming system compatible with user-controlled mobile devices controlled is described. The gaming system can include gaming devices, such as slot machines, and signage distributed throughout a casino enterprise that transmit gaming information in an optical format, such as via 1-D or 2-D bar codes. An application executing on the user's mobile device can be configured to capture and process the optically formatted gaming information and transmit it to a remote server. The remote server can be configured to provide various games that are affected by the received game information. In particular embodiments, the remote server can be configured to provide lottery type games and scavenger hunt type games.

18 Claims, 5 Drawing Sheets

GRAPHIC CAPTURE IN A MOBILE LOYALTY NETWORK

BACKGROUND

1. Field of the Described Embodiments

The described embodiments relate generally to gaming systems, such as gaming systems deployed in a casino enterprise. More particularly, apparatus and method for developing and maintaining customer loyalty in the casino enterprise are described.

2. Description of the Related Art

Developing and maintaining a loyal customer base is a critical component of operating a successful casino enterprise. To develop a loyal customer base, casino enterprises offer customers the chance to participate in a loyalty program that allows their activities to be tracked. For a customer to participate in a loyalty program, the casino enterprise creates an account for the customer and requires the customer to provide identification information, such as their name and address. The identification information is stored to the account. An instrument, such as a magnetic striped card, is provided to the customer. The instrument can include an account number associated with the loyalty program account created for the customer.

The instrument is utilized during various activities within the casino enterprise so that a record of the customer's activities are generated and stored to an account associated with the instrument. As an example, a customer can insert a magnetic-striped player tracking card into a card reader associated with a slot machine to have a record of their gaming activity on the slot machine stored to the account associated with the player tracking card. Based on their activities, such as an amount spent, the casino enterprise can offer the customer "comps" (complimentary offers), such as free or discounted services, which encourage a customer to return. In addition, the casino enterprise can mine and analyze the information gathered from the loyalty program to better understand the demographics and behavioral patterns of their customers. The analysis can be used to better tune their operating models, such as their mixture of services and comps that are provided, with the objective of increasing their profitability.

One disadvantage of card based loyalty programs that utilize magnetic striped cards is that to track a purchase of an activity by individuals, a card reader or some other interface is needed at each location where the activity is purchased. For instance, to track gaming activity on slot machines, a card reader or some other interface for entering the loyalty program information is needed on each slot machine. Thus, loyalty program interactions are limited to locations where the card reader interfaces are provided. Another disadvantage is that a network infrastructure has to be installed and maintained that allows activity information to be captured and stored to a customer's account identified on the magnetic striped card. The costs associated with installing and maintaining the network infrastructure are a disincentive to expanding the locations where activity information is gathered. Thus, loyalty program associated customer interaction opportunities are lost.

In view of the above, methods and apparatus are desired that minimize infrastructure costs associated with increasing the locations where customer activities are tracked as part of a loyalty program.

SUMMARY OF THE DESCRIBED EMBODIMENTS

A gaming system compatible with user-controlled mobile devices controlled is described. The gaming system can include gaming devices, such as slot machines, and signage distributed throughout a casino enterprise that transmit gaming information in a machine readable optical format, such as via 1-D or 2-D bar codes. The optically formatted gaming information can be generated by a local server coupled to the gaming devices via a local area network maintained by the casino enterprise. An application executing on the user's mobile device can be configured to capture and process the optically formatted gaming information and transmit it to a remote server coupled to the mobile device via a wide area network maintained by the mobile device service provider.

The remote server can be configured to provide a loyalty program services to the mobile device holders. On the remote server, the loyalty program services can be provided in conjunction with or independent from the loyalty programs offered from various casino enterprises. In one embodiment, the remote server can be configured to provide various games that are affected by the gaming information received from the mobile devices. The gaming information can be gathered via the mobile device from a single or multiple casino properties. In particular embodiments, the remote server can be configured to provide lottery type games and scavenger hunt type games.

One aspect can be described as a method in a server including a processor and a memory configured to directly communicate with a plurality of wager-based gaming devices via a local area network. The method in the server can include 1) receiving gaming information from the plurality of wager-based gaming device via the local area network including the a first wager-based gaming device; 2) receiving from a first wager-based gaming device a request to include the gaming information in a machine readable optically formatted image data; 3) generating instructions for creating or generating the machine readable optically formatted image data wherein the machine readable optically formatted image data encodes gaming information and a unique identifier; and 4) sending the instructions for creating or the generated machine readable optically formatted image data to the first wager-based gaming device where the machine readable optically formatted image data is output to a display device on the first wager-based gaming device.

A second aspect can be described as a method in a server configured to directly communicate with a plurality of mobile devices via a wide area network. The method can include: 1) receiving from a first mobile device information about a loyalty program account maintained on the server; 2) receiving from the first mobile device machine readable optically formatted image data wherein the machine readable optically formatted image data was displayed on a wager-based gaming device and captured via an image capture mechanism on the first mobile device; 3) translating the machine readable optically formatted image data wherein the machine readable optically formatted image data encodes gaming information associated with game play on the wager-based gaming device and a unique identifier; 4) authenticating the gaming information based upon the unique identifier; and 5) when the gaming information is authenticated, storing the gaming information to the loyalty program account.

A third aspect can be described as method in a wager-based gaming device including a display. The method can include 1) receiving a wager on the wager-based game; 2) determining an outcome to the wager-based game; 3) displaying the outcome to the wager-based game to the display; 4) receiving a request to display a machine readable optically formatted image data encoding gaming information associated with the outcome via an input mechanism on the wager-based gaming device; 5) sending the gaming information and a request for the machine readable optically formatted image data to a local server via a local area network; 6) receiving the machine readable optically formatted image data encoding the gaming information from the local server; and 7) displaying the machine readable optically formatted image data to the display.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
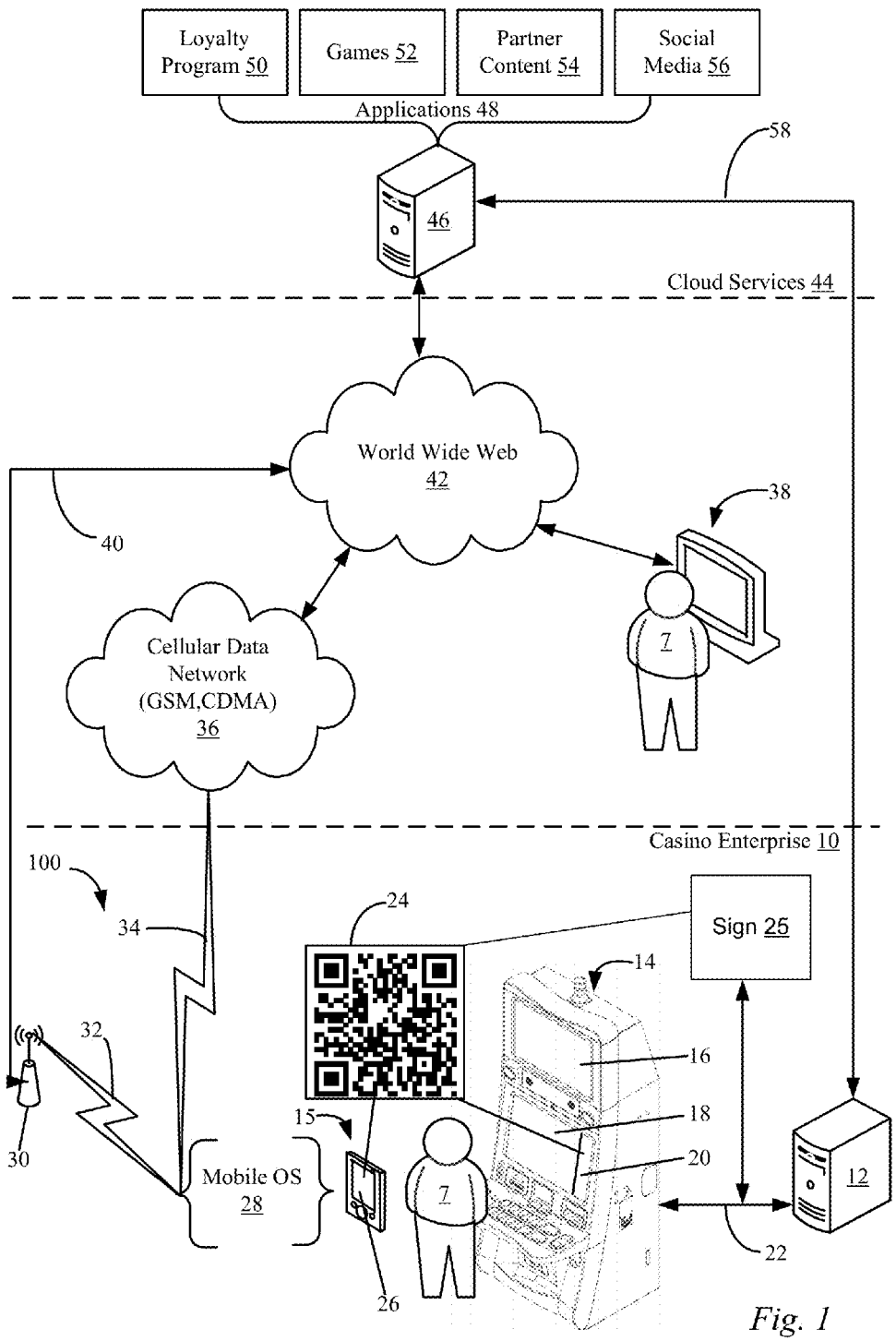
FIG. 1 shows a block diagram of a gaming system compatible with user controlled mobile devices in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with mobile devices controlled by users of the gaming system is described. The gaming system can include gaming devices, such as slot machines, and signage distributed throughout a casino enterprise that transmit gaming information in a machine readable optical format. In a particular embodiment, the optically formatted gaming information can be displayed as 1-D and/or 2-D bar codes, such as a QR code. A local server coupled to the gaming devices via a local area network can be configured to generate image data including the machine readable optically formatted information. A mobile application executing on the user's mobile device can be configured to capture and process the optically formatted gaming information and transmit it to a remote server via a wide area network. The optically transmitted gaming information can be processed on the user's mobile and/or the remote server. For instance, machine readable optically formatted data can be translated to a user readable format on the user's mobile device and/or on the remote server.

In particular embodiments, the communication between the mobile device and the gaming devices in the gaming system, such as slot machines displaying the optically formatted gaming information, may be limited to only uni-directional communications. Thus, the mobile devices can be configured to receive the machine readable optically formatted gaming information from a particular gaming device but not directly communicate with the particular gaming device. A gaming system configured to interact with user controlled mobile devices in this manner is described with respect to FIG. 1.

Via the application executed on the user's mobile device and network infrastructure, such as the network infrastructure provided by the mobile device service provider, the mobile device can be configured to communicate with a remote server via a wide area network. The remote server can be configured to receive and to process the optically formatted gaming information captured by various mobile devices. The remote server can use the gaming information to provide loyalty program services and activities, such as games, that can be played by users with the mobile application installed on their mobile device. A few examples of games include 1) lottery games where the capture of a particular instance optically formatted information can be used to enter a user into a lottery game or 2) scavenger hunt games where the optically formatted information can be used to transmit information in regards to what items a player has gathered. The games can be part of a loyalty program supported by the remote server. The loyalty program can be separate from or supplement a loyalty program provided by the casino enterprise.

Various awards can be provided for the games including cash prizes, merchandise and promotional offers (e.g., discounts on a merchandise item or service). Further, the awards can be non-tangible items, such as in-game items that affect the play of a game offered via the gaming system but have no cash value. In some embodiments, the gaming system can be configured to allow players to trade or give in-game items to one another. For instance, if during play of a scavenger hunt game a player gathers two identical game items, the system can be configured to allow one player to trade or give one of the identical game items to another player. Apparatus and methods for generating game play in the gaming system are described with respect to FIGS. 2 and 3. Finally, details of gaming devices, such as slot machines, that are compatible with the apparatus and the methods described above are discussed with respect to FIGS. 4 and 5. Next, a gaming system compatible with user-controlled mobile gaming devices is described with respect to FIG. 1.

FIG. 1 shows a block diagram of a gaming system 100 compatible with user controlled mobile devices in accordance with the described embodiments. As will be described in more detail as follows, an image can be generated on a display device in the gaming system 100. The image output on the display device can include a bar-code, such as a 2-D bar-code. In one embodiment, the bar-code can encode information, such as details about content, besides the bar-code, contained in the image. For instance, an image including a jackpot might be supplemented with a machine readable optically formatted data that indicates when the jackpot was won, how much was won, the location where it was won, the type of game it was on, etc. A mobile device, such as 15, can be configured to capture the image including the data encoded in a bar-code using a camera on the mobile device.

After capture of an image using the mobile device, the image data can be transmitted to a cloud hosted web datacenter, such as 46. If the player took a series of images during their trip that included this type of bar-coded information, the bar-coded data associated with image might be used as a mechanism for organizing the images. For instance, the remote server 46 can be configured to receive parameters that allow the player to organize and display their images. For instance, the player might specify to organize their images in chronological order, via the type of game played or ranked in order according to the award amount. In response, the server 46 can be configured to display the images according to the specified organizational parameters. In one embodiment, the interaction between the server 46 and a player can be performed from a web-browser. For instance, player 7 might connect to the world-wide web 42 via a browser displayed on device 38 to view and organize their captured images.

In another embodiment, the machine readable optically formatted information can be used as a communication mechanism for transmitting information to the user's mobile device without requiring an interactive communication between the user's mobile device and the gaming device. For instance, the player can request a summary of their game play session that has been completed on a gaming device. In response, the information can be optically formatted as a single bar-code or a series of bar-codes and displayed on the gaming device. Again, the machine readable optically formatted information can be captured via a camera on the mobile device. After capture, the optically formatted information can be translated to a user readable format on the mobile device or uploaded to the remote server 46 for translation. After translation into a user readable format, the information encoded in the image data can be output to a display and viewed by the user.

In other embodiments, the machine readable optically formatted information can encode game information. For instance, the game information can enable a player to enter into a drawing for a lottery game. In another example, the game information can unlock a feature of game hosted at the loyalty web-site or some other $3^{rd}$ party web-site, such as a social media site providing a social media game. In yet another embodiment, the game information might be used to allow the player to play a scavenger hunt game involving the player going to and/or performing actions at different locations within one or more casinos. With respect to the following paragraphs, details of various devices that can be used in the gaming system 100 and their interactions are described.

Within the casino enterprise 10, the gaming system 100 can include gaming devices, such as 14, configured to provide play of a wager-based game. The gaming device 14 includes displays 16 and 18. The displays, 16 and 18, can be used to output game content, such as image data associated with the play of the wager-based game on the gaming device 14. The game content output to the displays can be controlled by a game controller located within the gaming device. Additional details of the gaming devices, such as 14, are described with respect to FIGS. 4 and 5.

In particular embodiments, the gaming device 14 can include a display that can receive content from a server remote to the gaming device, such as server 12. The server 12 can be used to generate image data including bar-codes that can be captured by the mobile device 15 and uploaded to web-data center, such as server 46. The server 12 can communicate with gaming devices, such as gaming device 14, via a local area network, such as 22. The local area network 22 is typically maintained under the direction of the casino enterprise 10.

In one embodiment, the display used to output content from the server 12 can be shared with the game controller on the gaming device 14 such that both the server 12 and the game controller can output content to the display 18. As an example, a portion 20 of display 18 can be used to output content received from the server 12 while a remaining portion of the display can be configured to output game content from a game controller. The portion 20 of display 18 can be opened and closed in response to an input received at the gaming device 12, such as in response to a user input or in response to a command received from the server 12. In one embodiment, when the portion 20 is opened, the contents on display 18 visible before the portion was opened can be shrunk to the remaining portion of display 18.

An advantage of opening a window, such as 20, on a portion of display 18 while shrinking the current contents in the window is that both machine readable optically formatted data and an image of interest to the player can be displayed on a single display, such as 18, at the same time. For instance, the image on display 18 can include a game outcome resulting in a big award for the player, and optically formatted data associated with the image displayed to the side of the image. After capture of the image including both rendering of the game outcome and the optically formatted data, the image can be uploaded to a remote server, such as 46. The remote server can be configured to translate the optically formatted information from a machine readable format to a human readable format. Further, remote server might be configured to cut the portion of the image containing the optically formatted machine readable data from the image such that only the image content associated with the rendering of the big award is displayed. This portion of the image can also be displayed with information translated from the optically formatted data. As described above, if multiple images were taken, the images can be organized according to the parameters provided by the account holder.

In other embodiments, a display not controlled by the game controller can be used to output content can be used to display content from server 12. For instance, a display on a player tracking unit that is controlled by a player tracking controller separate from the game controller can be used to output content from server 12. In another example, the gaming device 14 can include a dedicated display that only outputs content from server 12.

In one embodiment, the machine readable optically formatted image data can be generated by the game controller on the gaming device. In another embodiment, the optically formatted image data can be generated by a server coupled to the gaming device 14, such as server 12. As described above, typically, a dedicated local area network, such as 22, can be established between the server 12 and the gaming device 14. This network can be a private network casino operated network that is separate from the cellular data network 36.

The local area network, such as 22, can allow the server 12 to send content to output to particular display. Further, the local area network can allow the gaming device to send information to the server 12 that can be incorporated in the image data generated by the server 12. For instance, the gaming device can send game play related information to the server 12 that can be converted into a machine readable optical format by server 12. In one embodiment, the communications between the gaming device 14 and the server 12 can be implemented using a gaming communication protocol, such as G2S (G2S is managed by the Gaming Standards Association, Fremont Calif.). In a particular embodiment, the gaming device 14 can be configured to support an Adobe flash Player™ for outputting content under the control of instructions and data received from the server 12 to one it's of displays.

Besides gaming devices, such as slot machines, the server 12 can be configured to output content to a variety of devices with displays located in the casino enterprise 10. For instance, the server 12 can be configured to output content to overhead signs, such as sign 25, and kiosks (not shown) within a casino that is part of the casino enterprise 10. The displays may also support a multimedia player, such as an Adobe Flash Player™. The displays, such as 25, can be used to generate images including machine readable optically formatted data that can be captured by any player in the casino. In one embodiment, the image with optically formatted image data can come up like an ad rotator on a timed sequence on a sign or kiosk. In a particular embodiment, players that capture the image via their mobile device and transmit to the remote server 46 can be entered into a drawing for a prize.

As described above, the displays receiving content from server 12 can be used to generate images that can be captured by players in the casino that have access to a mobile device including an imaging device, such as a camera. For instance, player 7 can carry mobile device 15 which can be outfitted with a camera. Many types of images can be generated by server 12 and output for capture by a user's mobile device 15. In particular embodiments, a generated image can include a single 1-D bar-code, multiple 1-D bar-codes, a single 2-D bar-code or multiple 2-D bar-codes. As an example, a 2-D bar-code, such as 24, can be generated. In one embodiment, a 2-D bar-code can be generated as a QR code compatible image but other bar-code formats can also be utilized.

As described above, the image can be constructed such that machine readable optically formatted data makes-up a small portion or substantially the entire image. For instance, an image of big jackpot won by player 7 can be generated where details about the jackpot, such as a time, place, jackpot amount, are encoded in a bar-code and added to the image where the majority of the image consists of the jackpot. For instance, the optically formatted data can be displayed in window portion 20 on display 18 and jackpot image can be displayed in the remaining portion. As another example, an image on sign 25 might mostly consist of a bar-code, such as 24. The image might include a small amount of text, such as "register for chance to win at www.winadrawing.com." But, the majority of the image rendered on the sign 25 may be taken up by the bar-code, such as 24.

On gaming device 14, the creation of an image can be triggered by a game event, specific session thresholds or through a player initiated request. A game event might be a win of a jackpot, such as a jackpot requiring the completion of a tax form. A specific session threshold might be an amount spent on gaming during a particular gaming session. A player initiated request might involve the player wishing to capture a specific image that is currently displayed on a display screen of the gaming device, such as display 16 or 18 of gaming device 14 and information about the image in machine readable optical format. The gaming device 14 can be configured to receive an input that causes a message to be sent from the gaming device 14 to the server 12 that requests the server to generate the machine readable optically formatted image data for output from the gaming device 14.

As an example of a player initiated request, a scavenger hunt game might involve the player capturing specific game outcomes that are generated for a particular game. When the specific outcome occurs, the player might initiate a request to capture the image and/or bar-coded data indicating that the specific outcome has occurred. The server 12 can generate the needed machine readable optically formatted data and send it back to the gaming device 14 for display. It can then be captured by a mobile device, such as 15. The bar-code captured by the mobile device can later be uploaded to a remote server, such as server 46, offered by cloud services 44. After the data is uploaded, the player, such as 7, can log onto a loyalty web-site that allows their progress in the scavenger hunt game to be viewed. As is described in more detail with respect to FIG. 2, the cloud services 44 can provide services to a number of locations including multiple properties within a casino enterprise or different properties at different casino enterprises.

As another example of a player initiated request, jackpot amounts above a certain threshold can require the player to fill out a tax form, such as a W-2G accrual form. The gaming device 14 can be configured to allow the player to perform this function at the gaming device, such as via a self pay. After completing the form, the player can request that the form information be transmitted to the player as machine readable optical image data. The gaming device can send the request including data that needs to be included in the machine readable optical image data to server 12. After receiving the data, the server can generate an image or instructions for generating a machine readable image including the received data. The image or instructions for generated the image can be sent from the server 12 to the gaming device 14 for display.

The player 7 can then capture the image, such as 24, on their mobile device 15. The mobile device 15 can upload the captured image via a wireless communication 34 on their cellular data network 36. The cellular data network 36 can connect the mobile device 14 to server 46, via the World Wide Web 42. In another embodiment, the mobile device 14 can communicate with server 46 via a wireless access point 30 directly connected to the World Wide Web via connection 40. The server 46 can be configured to translate the machine readable optically formatted image data and generate a copy of the correctly filled out tax form based upon the received image data. When the player 7 returns home and logs in to a website, supported by server 46, the server can be configured to generate a copy of the W2G accrual form from the earlier win and print it out if desired. The player can log into the loyalty website via device 38.

As described above, the gaming device 14 can be configured to send game event information and information used by server 12 to determine whether specific thresholds have been met using a communication protocol, such as G2S. In one embodiment, the server 12 can be configured to determine when thresholds associated with a game have met based upon information received from the gaming device 14. In response to a threshold being met, such as a threshold that allows an item in a scavenger hunt to be obtained, the server can generate machine readable optically formatted data, such as a bar-code, incorporating data that can be captured by a mobile device, such as 15, and then uploaded to remote server, such as 46. For instance, as described above, if an event triggered on the gaming device is an event needed for a scavenger hunt game, the bar-code can include a description of the game item the player has earned.

The mobile device 15 can execute a mobile OS 28, such as but not limited to Windows CE 7 by Microsoft™, iOS by Apple™ or Android by Google™. Many different manufacturers provide cell phones with different features that support these operating systems. In one embodiment, the mobile devices can be configured to download an application that allows an image to be uniquely captured and processed in the context of the features, such as games, provide by the loyalty website at server 46. The application can be configured to work with different mobile operating systems. In one embodiment, the application can be provided to an on-line application store that a user can reach via World Wide Web 42 with their mobile device and the application can be downloaded from the on-line store. In another embodiment, the application can be downloaded from the loyalty web-site at server 46.

The mobile device can include a display 26. In one embodiment, a captured machine readable optically formatted data, such as 24, can be output to the display 26. The application downloaded to the mobile device 15 can be configured to translate the machine readable optically formatted data into a user reader format and display all or portion of the data encoded in the data to the display 26. As described above, the application may also be configured to upload the captured image and/or data translated from machine readable optically formatted data to the remote server.

As described above, the mobile device can access the World Wide Web 42 via a wireless access point, such as 30, or via a cellular data network, such as 36. The cellular data network can be a GSM or CDMA compatible network. The wireless access point 30 can support a wireless communication protocol, such as Wi-Fi standard. Within the casino enterprise, good wireless access may not be available at every location. When wireless access, such as cellular coverage, is intermittent, the mobile application can be configured to queue captured information and eventually deliver it the loyalty program 50 once the network signal is available again.

The server 46 can be configured to support a number of applications 48. In particular embodiments, the server 46 can support a loyalty program 50. The loyalty program 50 can be complementary to a casino enterprises loyalty program such that it provides additional features to an existing program. In another embodiment, the loyalty program can be separate from the casino enterprise's loyalty program. For instance, the loyalty program 50 can be associated with a gaming manufacturer, which provides a variety of games. In particular, the loyalty program can be associated with one or more gaming devices and/or one or more games provided by the gaming manufacturer. The loyalty program associated with the gaming manufacture can be designed to encourage players to play their games.

Games 52 are another application that can be supported by server 46. A few examples of games include but are not limited to lottery type games, such as drawings, and item collection games, such as scavenger hunt. If a user allows the GPS feature on the mobile device 26 to be enabled, one aspect of a game may involve travelling to and/or performing actions at particular locations where location data can be transmitted from mobiles devices to server 46.

In one embodiment, as part of a complementary program, one or more of the applications on server 46 can be provided as a part of operator-sponsored promotional system. The promotional system could be tied to the operator's loyalty program. One objective of the applications can be to encourage a player to register with the operator's loyalty program. For instance, certain applications, such as games, may only be provided for members of the operator's loyalty program. Thus, the knowledge of the applications can encourage players to sign up for the operator's loyalty program. In another example, a participant in activity supported by server 46 via an application may not be required to be a member of the operator's loyalty program. However, built-in into the application can be advertisements indicating the sponsorship of operator.

Further, applications can encourage a participant to register for the operator's loyalty program and indicate incentive for registration. For example, in a lottery game or scavenger hunt game application a link to an interface that allows a participant to register with the operator's loyalty program can be provided. As an incentive to registering, the participant in the lottery game can be offered additional entries in the lottery game. Whereas, the participant in the scavenger hunt game can be offered one or more free items in the games for registering. In some games, additional levels can be unlocked when the participant registers for the operator's loyalty program which are not available to non-registered participants. In addition, the participant can be offered free game play, such as promotional credits on a slot machine for registering with the operator's loyalty program.

Partner content 54 can be included in the applications 48. Partner content might involve displaying advertising, offers and promotions for partners associated with the site. Yet another application is social media 56. Social media 56 might involve transferring information received via the loyalty program 50 to a social media site, such as Facebook™. As an example, a player can create a Facebook link on the web site associated with the loyalty program 50.

In one embodiment, the web-site can support an option that allows the player to have information uploaded to the server 46, such as their big wins, posted on their wall at the social media site. When the player hits big jackpot on a gaming device, such as a royal flush on a game where online loyalty plug-ins are supported, machine readable optically formatted data can be output to a display on the gaming device. The data in the machine readable optically formatted data can be captured by the mobile device 26 and transmitted the loyalty website and simultaneously posted on the player's Facebook wall using the Facebook API. Translation of the machine readable optically formatted image data can occur on the mobile device and/or at the loyalty web-site. At a basic level, the information sent through the image can contain the amount won, the location of the player and the winning cards. In some embodiments, an actual image of the winning hand can be posted to the web-site as well as to their Facebook wall.

In other embodiments, the system can be configured to support social media type games. For instance, the system may allow a player to play a game involving a simulation of a virtual casino and resort where game items, such as new gaming machines or types of games, can be earned based on the player's game play in the simulation. The system may allow other players to view and possibly visit a first player's virtual casino. The system can be configured to allow players to give items earned to their virtual casino to other players. In particular embodiments, the optically formatted information gathered during a player's visit to an actual casino can be used to earn game items that affect game play in the virtual casino and resort game. For instance, playing a particular game and/or a particular gaming device at a real casino might allow a virtual representation of the particular game or particular gaming device to be displayed in the player's virtual casino.

In the example of FIG. 1, the server 46 can be configured to communicate directly with mobile devices, such as 15, but not with gaming devices, such as 14. Further, server 12 can be configured to communicate directly with gaming devices, such as 14, but not the mobile devices, such as 15. In some embodiments, the server 12 and server 46 can communicate with one another. For instance, in one embodiment, the optically formatted information provided by server 12 can include unique identifying information that allows the authenticity of the image data to be authenticated and possibly limits the amount of times that it can be used. The servers 46 and server 12 can communicate with one another for the purposes of authenticating data. Further details of communications between a mobile device 15, server 12 and server 46 are described with respect to FIG. 3.

As an example, when server 12 generates an image that allows a game item to be earned for a game played at server 46, the server 12 might send information encoded in the image that allows it be authenticated as having been generated by server 12. The authentication information can be sent to the remote server 46 via communication channel, such as 58. When the server 46 receive information about the earned game item from a mobile device, such as mobile device 15, the server 46 can be configured to compare the information received from the mobile device 15 with the information received from server 12 to determine whether game item is a valid game item. In another example, the server 12 can encode in the image information that identifies server 12 as well as unique identifying information. When server 46 receives information translated from the image including the information identifying server 12 and the unique identifying information, the server 46 can contact server 12. The server 46 can send the unique identifying information that it has received and request server 12 to verify whether the unique identifying information is associated with a valid game item issued by server 12. In FIG. 1, the server 46 is shown connected to a single casino enterprise 10. In other embodiments, as is illustrated as follows with respect to FIG. 2, the server 46 can be configured to communicate with mobile devices located within a variety of casino enterprises.

In other embodiments, an application, such as a game, generated on server 46, can result in the generation of an award that can affect the operation of the gaming device 14. For instance, the server 46 can issue a unique identifier, such as a sequence of digits that can be entered via an interface at the gaming machine. The digits can include number and/or letters. When the unique identifier is received at the gaming device 14, it can be sent to server 12. Server 12 can then contact server 46 to determine whether the unique identifier is valid and hasn't been previously utilized. After verification of the unique identifier, server 12 can send a message to gaming device 14 that affects operation of the gaming device. For instance, a level in game played on the gaming device 14 can be unlocked. As another example, promotional credits can be added to the gaming device 14.

An example of an interaction between mobile device 15, server 46, gaming device 14 and server 12 involving affecting operation of gaming device 15 is described as follows. Via their mobile device 15, a user can register in the operator's loyalty program via communications with server 46 or receive free play points via an application implemented on a social media site, such as Facebook™. In response, the user can receive on their mobile device 15, a unique identifier that entitles them to free promotional play on gaming device 14. The user can request an interface that allows the unique identifier to be entered at the gaming device 14. The unique identifier can be sent to server 12 for verification. After successful verification, the server 12 can send a command to gaming machine 12 that enables the promotional credits to be deposited on gaming device 14. The promotional credits can be used for game play by the user on the gaming device.

In one embodiment, the unique identifier can be entered via an interface associated with service window 20. For instance, an interface for entering numbers and/or digits can be displayed in the window 20 where the numbers and/or digits can be selected via user selections in the interface. If the gaming device 14 includes image capturing capabilities, such as via a camera or a scanner, then it may be possible to provide the unique identifier as optically formatted image data that is output to the user's mobile device 15 where the optically formatted image data can be captured by the gaming device 14. The optically formatted image data can be interpreted by the gaming device 14 or the server 12 to determine the unique identifier associated with the optically formatted image data.

Figure 2:
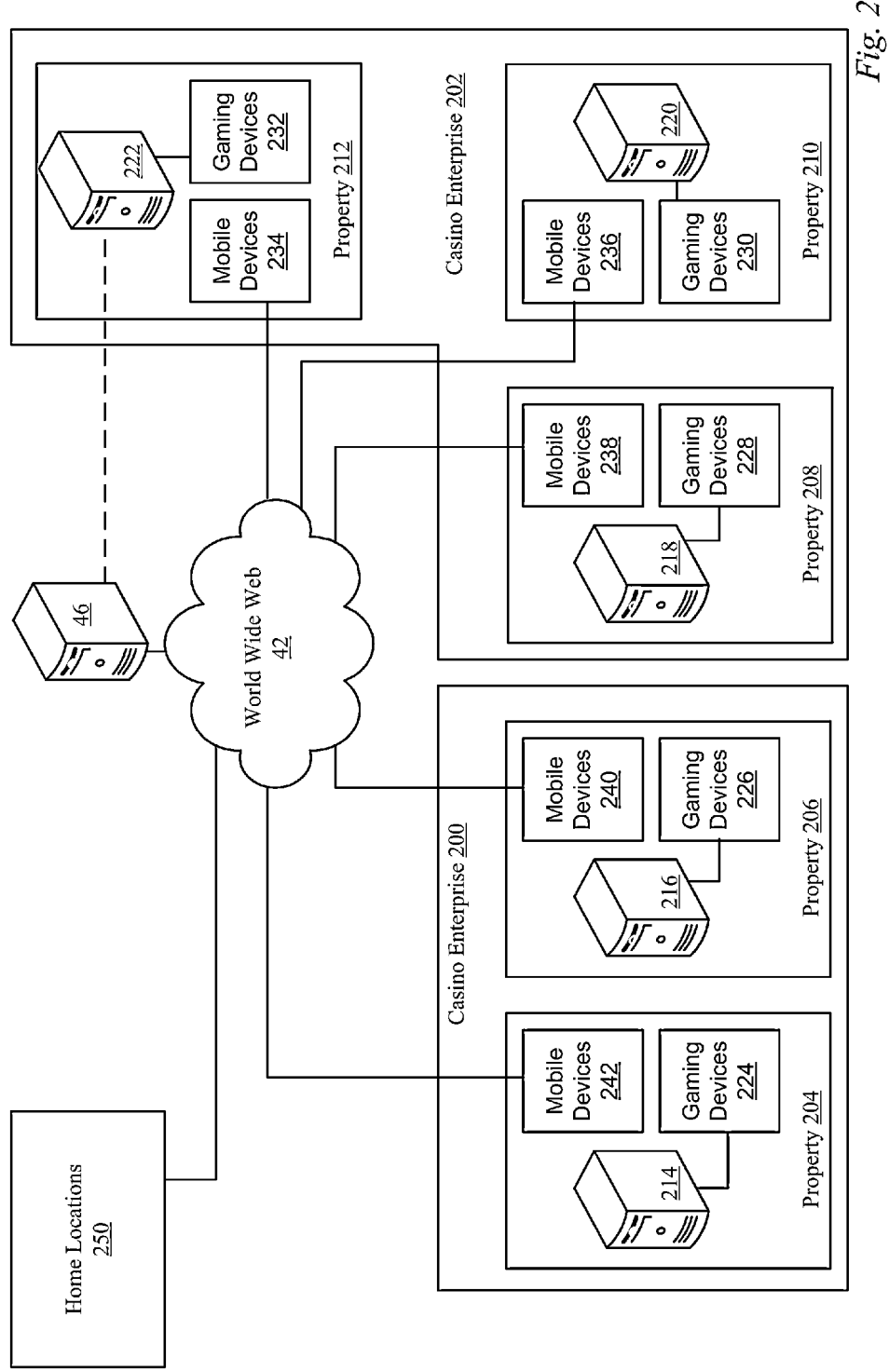
FIG. 2 shows a block diagram of a web server in communication with multiple gaming enterprises in accordance with the described embodiments.

Next, with respect to FIG. 2, multi-property and/or multi enterprise activities are described. FIG. 2 shows a block diagram of a web server 46 in communication with multiple gaming enterprises 200 and 202 in accordance with the described embodiments. Each of the casino enterprises 200 and 202 includes multiple properties. For instance, casino enterprise 200 includes properties 204 and 206 and casino enterprise 202 includes properties 208, 210 and 212. Each property can be separated by some amount distance. For instance, property 204 can be located in Reno, Nev. while property 206 can be located in Las Vegas, Nev. As another example, properties 208 and 210 can be located within Vegas while property 212 can be located in Macau, China.

At each property, there can be a local server that communicates directly with gaming devices. For instance, at property 204, server 214 communicates directly with gaming devices 224. At property 206, server 216 communicates directly with gaming devices 226. At property 208, server 218 communicates with gaming devices 228. At property 210, server 220 communicates with gaming devices 230. Finally, at property 212, server 222 communicates with gaming device 232.

Each of the gaming devices can be configured to output machine readable optically formatted image data, such as 2-D bar-codes. The machine readable optically formatted image data can be captured by nearby mobile devices including an image capture device, such as a camera. For instance, mobile devices 234, 236, 238, 240 and 242 can capture machine readable optically image data from gaming devices, 232, 230, 228, 226 and 224, respectively. The mobile devices, such as 234, 236, 238, 240 and 242 can be provided by different mobile device service providers and use different mobile operating systems.

Via a cellular network provided a mobile device service provider associated with each device or via a local wireless access point, such as an access point supporting Wi-Fi, each mobile device can be configured to communicate with server 46 via the World Wide Web 42. The mobile devices can be configured to send machine readable optically formatted data received from the gaming devices and/or human readable data translated from the machine readable optically formatted data to the server 46.

The server 46 can provide accounts, such as accounts associated with one or more loyalty programs, to user's of the mobile devices. The loyalty programs can be associated with different casino enterprises or a gaming device manufacturer. For instance, server 46 can support 1) a first loyalty program and first loyalty program accounts associated with casino enterprise 200 where information output via gaming devices 224 and 226 is stored to the first loyalty program accounts, 2) a second loyalty program and second loyalty program accounts associated with casino enterprise 202 where information from gaming devices 228, 230 and 232 is stored to the second loyalty program accounts and 3) a third loyalty program with third loyalty program accounts associated with a gaming device manufacturer where information gathered from the gaming device manufacture's devices at both casino enterprise 200 and casino enterprise 202 are sent to the third loyalty program accounts. A single user can have an account in one or more of the first loyalty program, the second loyalty program and the third loyalty program.

Within a casino enterprise, games supported by server 46, such as a scavenger hunt game, can involve activities at one or more properties where the different activities allow different items in the scavenger hunt game to be found. For instance, a scavenger hunt game provided to casino enterprise 200 can involve activities performed at one or both of properties 204 and 206. In some embodiments, multiple casino enterprises can partner to offer an application, such as a game. The server 46 can be configured to support a game associated with all or portion of the gaming devices within casino enterprises 200 and 202. For instance, a first game can involve the gaming devices at each of properties 204, 206, 208, 210 and 212 while a second game can involve the gaming devices at just property 204 within the first casino enterprise and at just properties 210 and 212 within casino enterprise 202.

The server 46 can be configured to communicate with the local servers 214, 216, 218, 220 and 222 via a secure communication channel, such as a VPN. Further, the server 46 can be configured to allow a loyalty program account holder to access data in their account and participate in applications, such as games, executed on the server 46. The loyalty program account holder can access the server 46 from locations where they have web-browser access, such as home locations 250 or their mobile device. In one embodiment, the server 46 can be configured to allow the user to register devices with their account, such as their mobile phone or their home computer. The server 46 can be configured to only recognize communications from registered devices with an account when granting access to the account.

The server 46 can be configured to communicate with each of the local servers, 214, 216, 218, 220 and 222 at the various properties. In one embodiment, the server 46 may communicate with the local servers to exchange authentication information. For instance, the local servers can be configured to include a unique identifier in the machine readable optically formatted image data. Each of the local servers can communicate the unique identifier coded in the machine readable optically formatted image data to the server 46. Thus, if the server 46 receives the machine readable optically formatted image data generated by one of the local servers from a mobile device, the server 46 can translate the image data to determine the unique identifier encoded in it and compare it to unique identifiers received from each of the local servers. If a match can be found, the server 46 may determine the machine readable optically formatted image data is valid. If a match can't be found, the server 46 can decide that the machine readable optically formatted image data is not valid. In one embodiment, image data determined not to be valid can be ignored by the server 46. Further details of interactions between server 46 and other devices in the system are described as follows with respect to FIG. 3.

Figure 3:
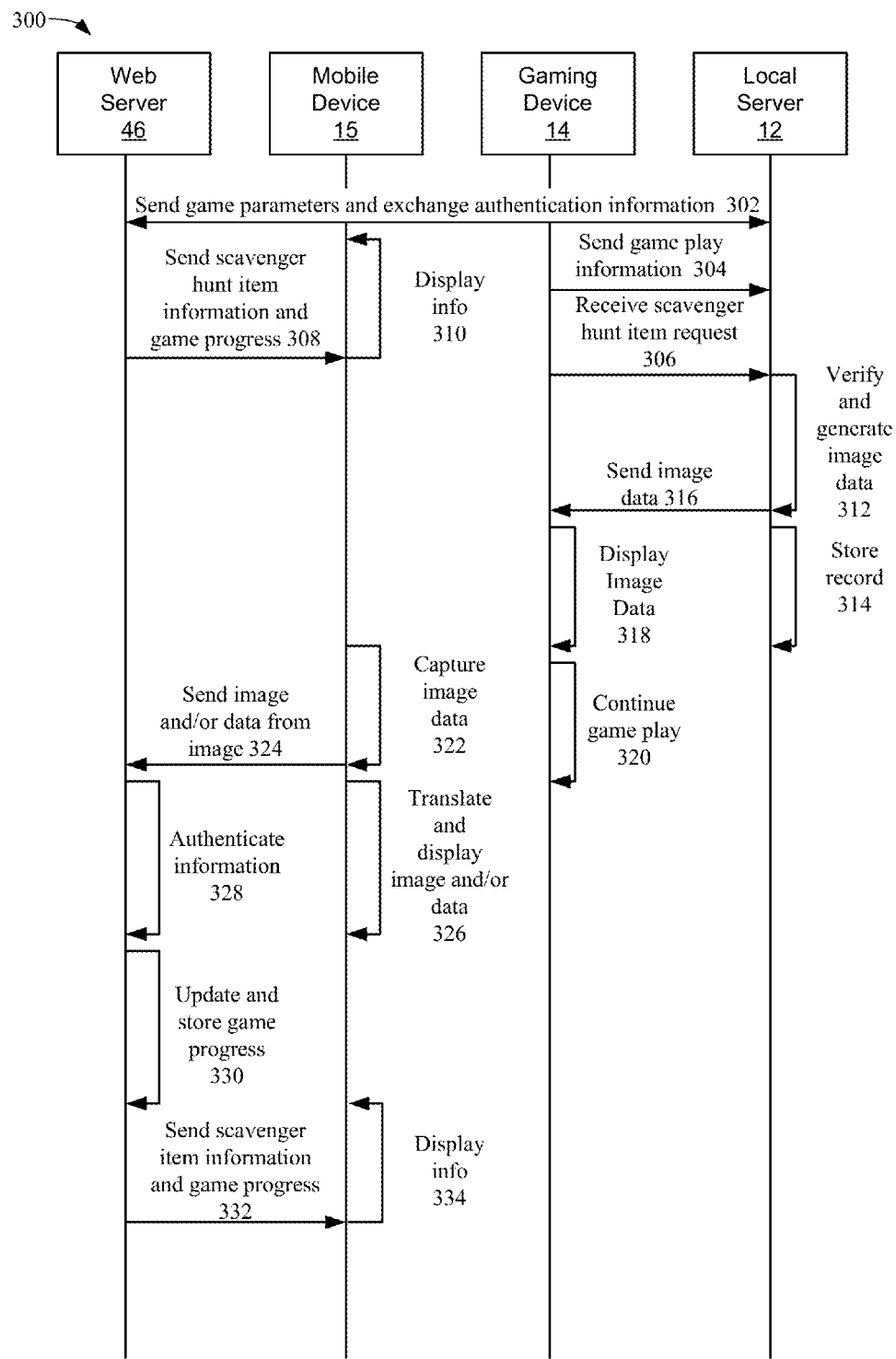
FIG. 3 is an interaction diagram between a web server, a local server, a gaming device and a mobile device for a scavenger hunt game in accordance with the described embodiments.

FIG. 3 is an interaction diagram in a system 300 between a web server 46, a local server 12, a gaming device 14 and a mobile device 15 for a scavenger hunt game in accordance with the described embodiments. In 302, the web server 46 and the local server 12 can exchange authentication information. For instance, the local server can send unique identifiers it is going to encode into 2-D bar-codes or the web server 46 can generate a unique identifier for the local server 12 to use in a bar-code. In one embodiment, the local server 46 can be configured to request a unique identifier from the web server 46 each time the local server 12 generates machine readable optically formatted image data. The local server 12 can incorporate the unique identifier in the optically formatted image data such that when the image data is decoded the unique identifier can be determined and used to validate the image data.

As described above, the local server 12 can be configured to monitor game events and game play information received from a gaming device, such as a slot machine. Based upon the game events and/or game play information, the local server 12 may trigger an event that involves the local server 12 creating machine readable optically formatted image data and then sending the image data to the gaming device for output via one of its displays. In 302, the server 46 may send different game event information and/or thresholds that can trigger the creation of machine readable optically formatted image data.

For instance, in a scavenger hunt game the creation of the machine readable optically formatted image data representing an item that has been earned in the game can be triggered based upon certain game outcomes occurring during the play of a particular game on a gaming device, such as 14, or amount of game play that has occurred during a game session on a gaming device, such as an amount wagered in a game session on gaming device 14. The criteria may vary from gaming device to gaming device depending on the game that is currently being played on the gaming device. Thus, the local server 12 may be configured to monitor each gaming device for a different set of criteria.

Further, the criteria may vary from game to game that is offered on server 46. For instance, the server 46 can support a number of different scavenger hunt games where different criteria are provided in each game for earning items. The local server 12 can download the rules for each of the scavenger hunt games on monitor gaming devices for events associated with the rules of each game.

In one embodiment, a player may enroll in one or more games at web server 46. When the player identifies themselves at a gaming device, such as via loyalty program instrument, the local server 12 can request the games a player which the player has enrolled from web server 46. Then, the local server 12 may monitor the gaming device for gaming events only associated with the games to which the player has enrolled.

In other embodiments, the local server 12 may configured not to monitor the gaming device for events associated with games provided by server 46. The gaming devices can be configured to request the local server 12 generate machine readable optically formatted image data in response to a request input at the gaming device. For instance, a user at the gaming device may notice that are particular game outcome that is needed for a scavenger hunt has occurred on the gaming device. In response, the user can request a machine readable optically formatted image data encoding the game outcome to be generated. Then, the user can capture the image data with their mobile device, such as 15. An application executing on the mobile device can verify that the game outcome was needed for the scavenger hunt and then upload it to the web server 46.

The mobile device can be configured to notify the user whether the game outcome was a needed game outcome or not. Further, the application can be configured to advise the player in regards to additional items that are needed, such as a particular game outcome for a particular game or an amount of game play of particular game. For instance, in 308, the web server 46 can send game information, such as scavenger hunt item information and a player's progress in a game, such as items found and items needed to mobile device 15. The mobile device 15 can display the information in 310. An advantage of this approach is that since the player is responsible for determining when an event has occurred, such as an event associated with game provided on server 46, the local server 12 may not have to perform this monitoring or receive instructions from web server 46 in regards to what events need to be monitored.

In 304, the gaming device 14 can send game play information to the local server 306. In 306, the gaming device can receive item request. This request can be initiated in response to a player input made on gaming device 14. In one embodiment, if the server 12 knows which scavenger hunt items are valid, then in 312, the local server can verify that the state of the gaming device is consistent with an item to be found in the scavenger hunt game. If the server doesn't know about the game rules, then in 312, the local server 12 can simply generate machine readable optically formatted image data that encodes information about the current state of the gaming machine, such as the last award made on the gaming machine.

In 316, the local server can send the image data or instructions for rendering the image data on the gaming device 14 to the gaming device. In 318, the gaming device can output the received image data to one of its displays. For instance, the image data can be output via a media player, such as a Flash Player™, that is executed on the gaming device 14. In 320, the gaming device can continue game play based upon inputs received from a user at the gaming device 14.

In 322, the mobile device 15 can capture image data in the machine readable format. In one embodiment, in 326, the mobile device can be configured to translate all or a portion of the machine readable data into a human readable format, such as text, and output to a display on the mobile device. The text can be output separately or in combination with the capture machine readable optically formatted image data. In 324, after establishing a communication connection with web-server 46, the mobile device 15 can send the captured image data and/or translated data to the web-server 46. Establishing the communication connection might involve the user entering a password or some other identification information to allow the server 46 to receive data from the mobile device 15 and place it into a particular account maintained at server 46. If the mobile device 15 is registered with the account, then the web server 46 can be configured to determine that hardware identification information associated with the mobile device 15 matches information stored in the account. If the hardware identification information doesn't match, the server 46 can be configured to ignore the information and possibly end the communication session with the mobile device 15.

The web server 46 can receive the machine readable optically formatted image data and/or data translated from the image data into a different format, such as a human readable format. If the image data includes a unique identifier, then in 328, the web server 46 can be configured to compare the unique identifier obtained from the image data with a database of valid identifiers where the comparison can be for the purposes of authentication. The database may store a record of whether the identifier has been previously been used to earn a game item in the scavenger hunt game. If the identifier from the image data can't be matched to a valid identifier in the database and/or it has been previously used then the web server 46 can be configured to reject the game information contained in the image data, such as game information describing an item earned in the scavenger hunt game.

In one embodiment, the web server 46 can allow user to share or trade items earned in a scavenger hunt game. In the case where an item is shared, the web server might allow machine readable optically formatted image data to be used multiple times by different players. For instance, the mobile device 15 can be configured to share image data with another mobile device. The web server 46 can store in a redemption database how many times a particular image, such as a 2-D bar code has been redeemed. The web server 46 can be configured to allow the bar-code to be redeemed a limited number of times. If the player that originally earned the game item associated with the bar-code is identified. Then, the web server 46 can be configured to provide an award to the player if the game item that was shared is redeemed by a number of other players.

In the case of item trading, the web server 46 can be configured with an interface that allows account holders to trade game items. The web server 46 can verify that game items that two players wish to trade are valid for use in the game. Further, the interface can broker the exchange, such that when both account holders agree to a particular trade, the game items are transferred between the accounts.

In 330, after a game item earned in the scavenger hunt game is authenticated, in 330, the web server 330 can update the game and store the player's game progress. In 332, the web server can send the information regarding additional items needed in the scavenger hunt game to the mobile device. Further, the web server can send information including images indicating the player's current status in the scavenger hunt game and current prize information associated with the game. In 334, the mobile device 334 can receive and then output the game progress and needed item information to a display on the mobile device. Next, additional details of gaming devices that can be utilized are described.

Figure 4:
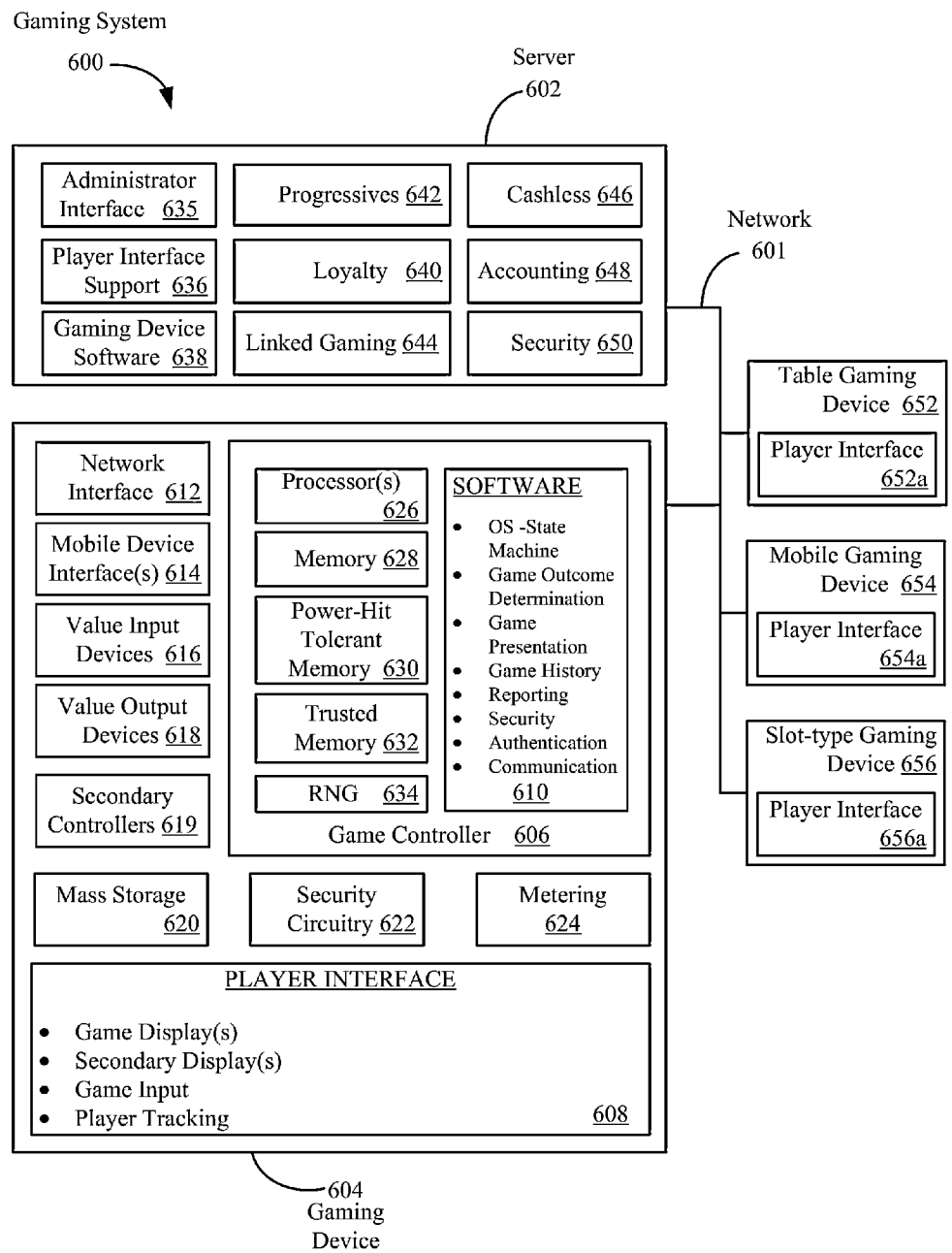
FIG. 4 shows a block diagram of a gaming system including a server and gaming devices in accordance with the described embodiments.

FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652a, 654a and 656a, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Figure 5:
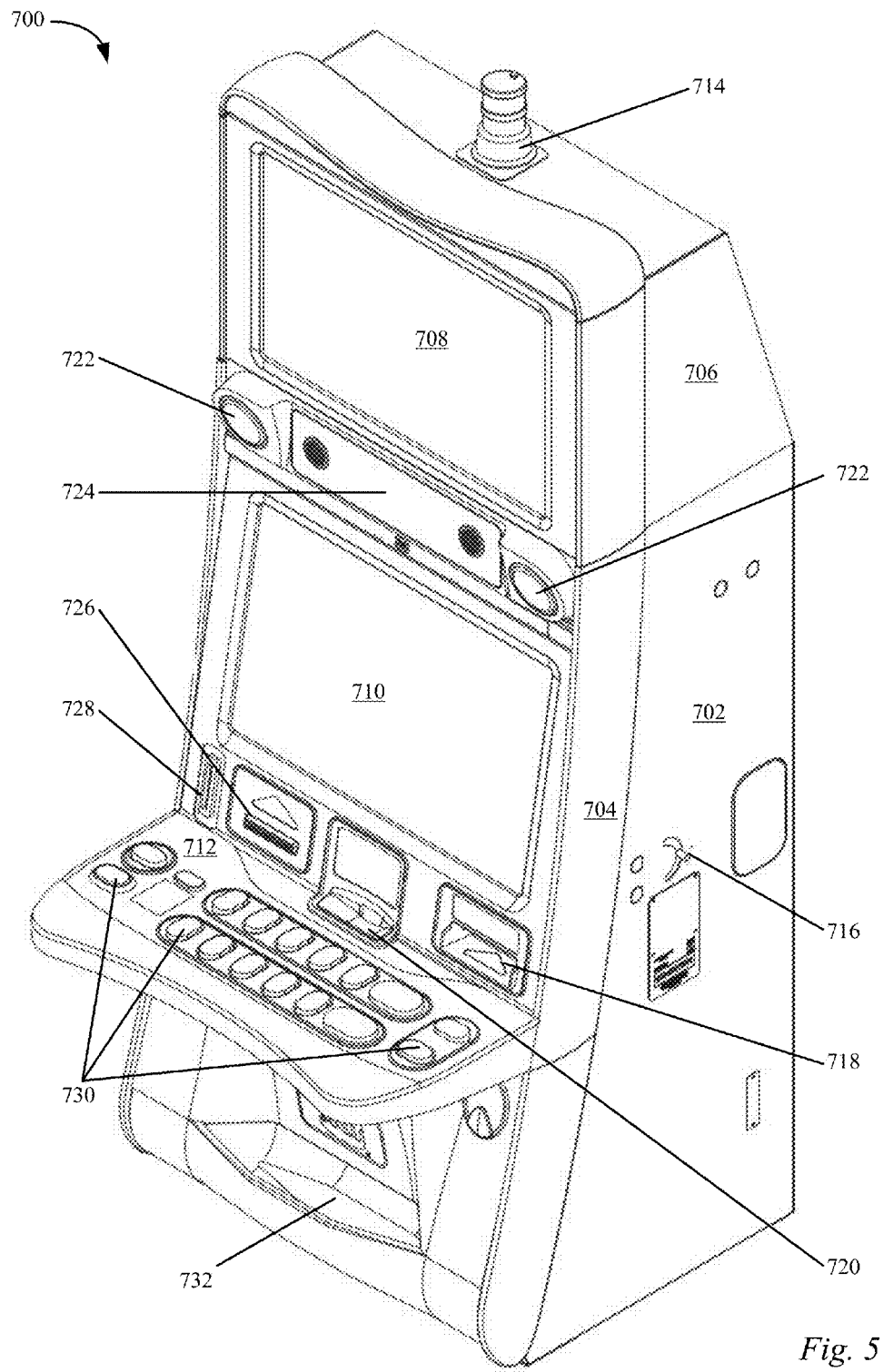
FIG. 5 shows a perspective drawing of a gaming device in accordance with the described embodiments.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652a, 654a and 656a. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method in a server including a processor and a memory configured to directly communicate with a plurality of wager-based gaming devices via a local area network, the method comprising:

receiving gaming information from the plurality of wager-based gaming device via the local area network including a first wager-based gaming device;

receiving from the first wager-based gaming device a request to include the gaming information in a machine readable optically formatted image data;

generating the machine readable optically formatted image data or instructions for creating the machine readable optically formatted image data wherein the machine readable optically formatted image data encodes gaming information and a unique identifier;

sending the generated machine readable optically formatted image data or the instructions for creating the machine readable optically formatted image data to the first wager-based gaming device wherein the machine readable optically formatted image data is output to a display device on the first wager-based gaming device; and based upon the gaming information received from the first wager-based gaming device, determining that an item has been earned in a scavenger hunt game maintained on a remote server and encoding information about the item in the machine readable optically formatted image data.

2. The method of claim 1, wherein the machine readable optically formatted image data includes one or more of a single 1-D bar-code, a plurality of 1-D bar-codes, a 2-D bar-code, or a plurality of 2-D bar-codes.

3. The method of claim 1, further comprising:
prior to generating the machine readable optically formatted image data or the instructions for creating the machine readable optically formatted image data, receiving the unique identifier from the remote server.

4. The method of claim 1, further comprising: sending the unique identifier to the remote server, wherein the unique identifier is used to authenticate the machine readable optically formatted image data.

5. The method of claim 1, wherein the machine readable optically formatted image data further encodes one or more of identification information associated with the first gaming device, identification information associated with the server, identification information associated with a location of the gaming device, or identification information associated with a player playing the first wager-based gaming device.

6. The method of claim 1, wherein the gaming information received from the first wager-based gaming device includes information about a game outcome from a game played on the first wager-based gaming device, and wherein the information about the game outcome and/or the game played is encoded in the machine readable optically formatted image data.

7. The method of claim 1, wherein the gaming information includes information needed to fill out a tax form, and wherein the machine readable optically formatted image data encodes the information needed to fill out the tax form.

8. The method of claim 1, further comprising: based upon the gaming information received from the first wager-based gaming device, determining a parameter associated with a game play session on the first wager based gaming device and encoding the parameter in the machine readable optically formatted image data.

9. The method of claim 1, further comprising: receiving parameters for determining the item has been earned in the scavenger hunt game.

10. The method of claim 1, further comprising: receiving parameters for determining items have been earned in a plurality of different games supported by the remote server.

11. The method of claim 1, further comprising: receiving information indicating that a particular player is participating in one or more games maintained on the remote server, determining based upon on the gaming information that the particular player has earned an item in one of the games,. and encoding information about the item in the machine readable optically formatted image data.

12. The method of claim 1, further comprising: generating second machine readable optically formatted image data or instructions for creating second machine readable optically formatted image data and sending the generated second machine readable optically formatted image data or the instructions for creating the second machine readable optically formatted image data to a display sign coupled to the server via the local area network for display to the sign.

13. The method of claim 12, wherein the second machine readable optically formatted image data encodes data that allows a person to participate in a lottery game.

14. A method in a server configured to directly communicate with a plurality of mobile devices via a wide area network, the method comprising:

receiving from a first mobile device information about a loyalty program account maintained on the server;

receiving from the first mobile device machine readable optically formatted image data wherein the machine readable optically formatted image data was displayed on a wager-based gaming device and captured via an image capture mechanism on the first mobile device;

translating the machine readable optically formatted image data wherein the machine readable optically formatted image data encodes gaming information associated with game play on the wager-based gaming device and a unique identifier;

authenticating the gaming information based upon the unique identifier;

when the gaming information is authenticated, storing the gaming information to the loyalty program account; and wherein the gaming information includes information related to an item earned in a scavenger hunt game.

15. The method of claim 14, further comprising receiving from the first mobile device second machine readable optically formatted image data, wherein the second machine readable optically formatted image data was displayed on a second wager-based gaming device and captured via an image capture mechanism on the first mobile device.

16. The method of claim 15, wherein the wager-based gaming device is located at a first gaming property, and wherein the second wager-based gaming device is located at a second gaming property.

17. The method of claim 14, further comprising updating the scavenger hunt game based upon the item and sending a progress in the scavenger hunt game and information describing additional items needed for the scavenger hunt game to the first mobile device.

18. The method of claim 17, further comprising storing the progress in the scavenger hunt game to the loyalty program account.

\* \* \* \* \*